C. JOHANSON.
PATTERN CONTROLLED MECHANISM.
APPLICATION FILED FEB. 10, 1920.

1,353,756.

Patented Sept. 21, 1920.
5 SHEETS—SHEET 1.

Inventor
Charles Johanson

By Marcus Fenwick Lawrence
Attorneys

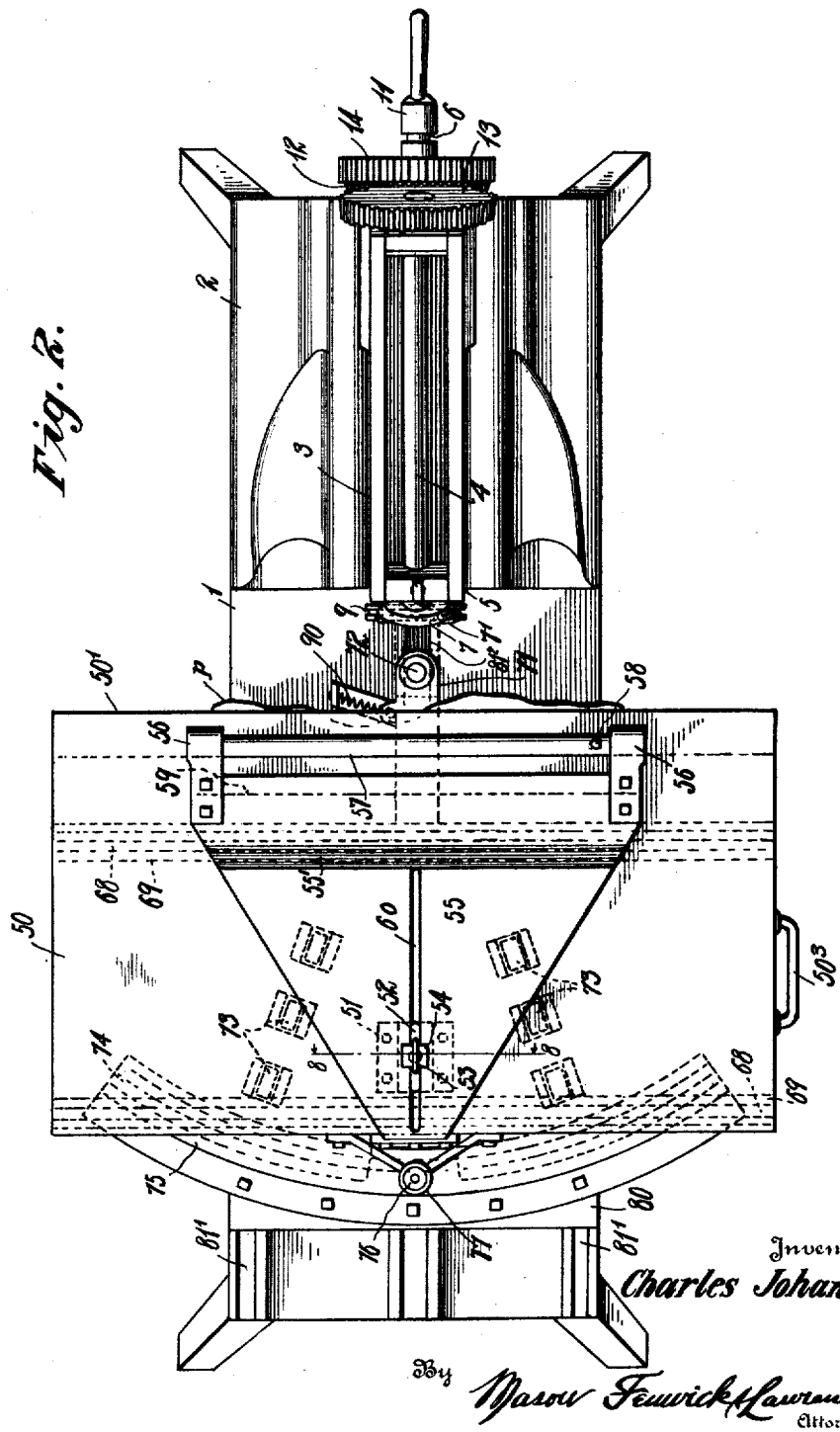

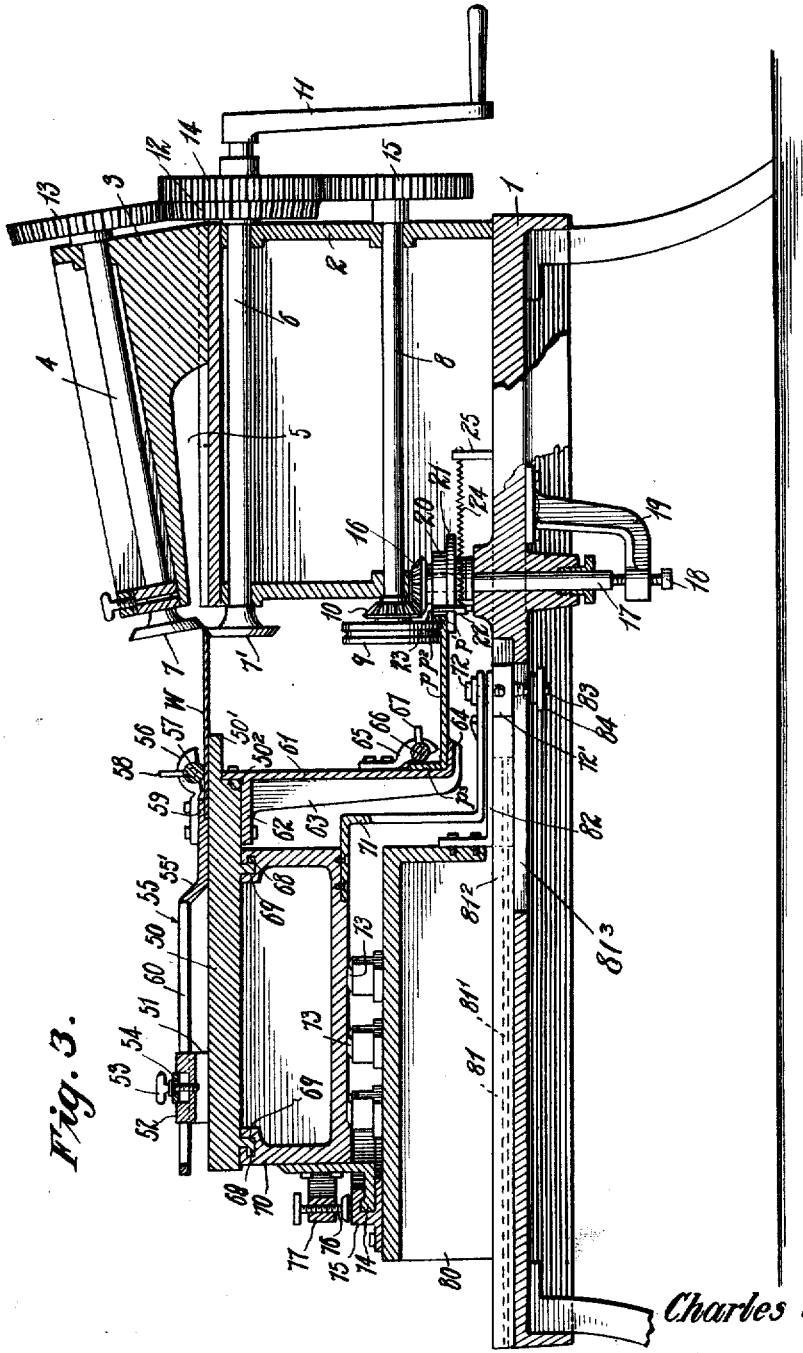

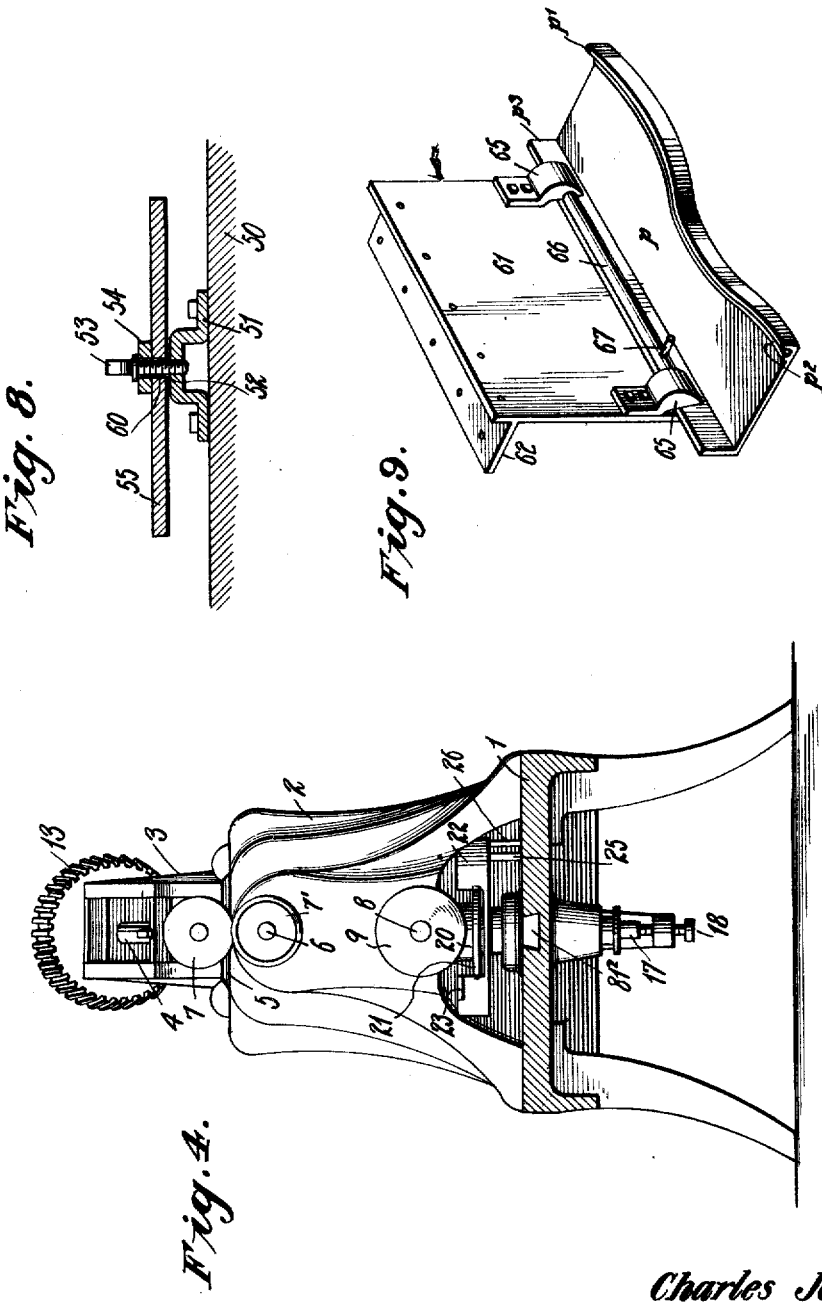

C. JOHANSON.
PATTERN CONTROLLED MECHANISM.
APPLICATION FILED FEB. 10, 1920.

1,353,756.

Patented Sept. 21, 1920.
5 SHEETS—SHEET 5.

Inventor
Charles Johanson

By Mason Fenwick Lawrence,
Attorneys

UNITED STATES PATENT OFFICE.

CHARLES JOHANSON, OF DOVER, NEW JERSEY.

PATTERN-CONTROLLED MECHANISM.

1,353,756.

Specification of Letters Patent.  Patented Sept. 21, 1920.

Application filed February 10, 1920. Serial No. 357,730.

*To all whom it may concern:*

Be it known that I, CHARLES JOHANSON, a citizen of the United States, residing at Dover, in the county of Morris and State of New Jersey, have invented certain new and useful Improvements in Pattern-Controlled Mechanisms; and I do hereby declare the following to be a full, clear, and exact description of the invention, such as will enable others skilled in the art to which it appertains to make and use the same.

This invention relates to pattern controlled mechanism whereby a piece of work may be cut out or otherwise tooled in duplication of or in accordance with a contoured pattern. The specific embodiment illustrated and described is a machine for shearing sheet metal plates to a given contour, and comprises a tool and a work holder adapted to have a relative and appropriate feeding movement, and a pattern by means of which the relative movement may be both imparted and controlled.

In the accompanying drawings:

Fig. 2 is a plan view thereof.

Fig. 3 is a central longitudinal section certain portions being shown in full line.

Fig. 4 is a section on dotted line 4—4 of Fig. 1 looking toward the cutting mechanism.

Fig. 8 is a section on the line 8—8 of Fig. 2.

Fig. 9 is a perspective of a pattern plate and the means for clamping it in position on the work table.

Similar reference characters indicate corresponding parts throughout the several views.

Figure 1:
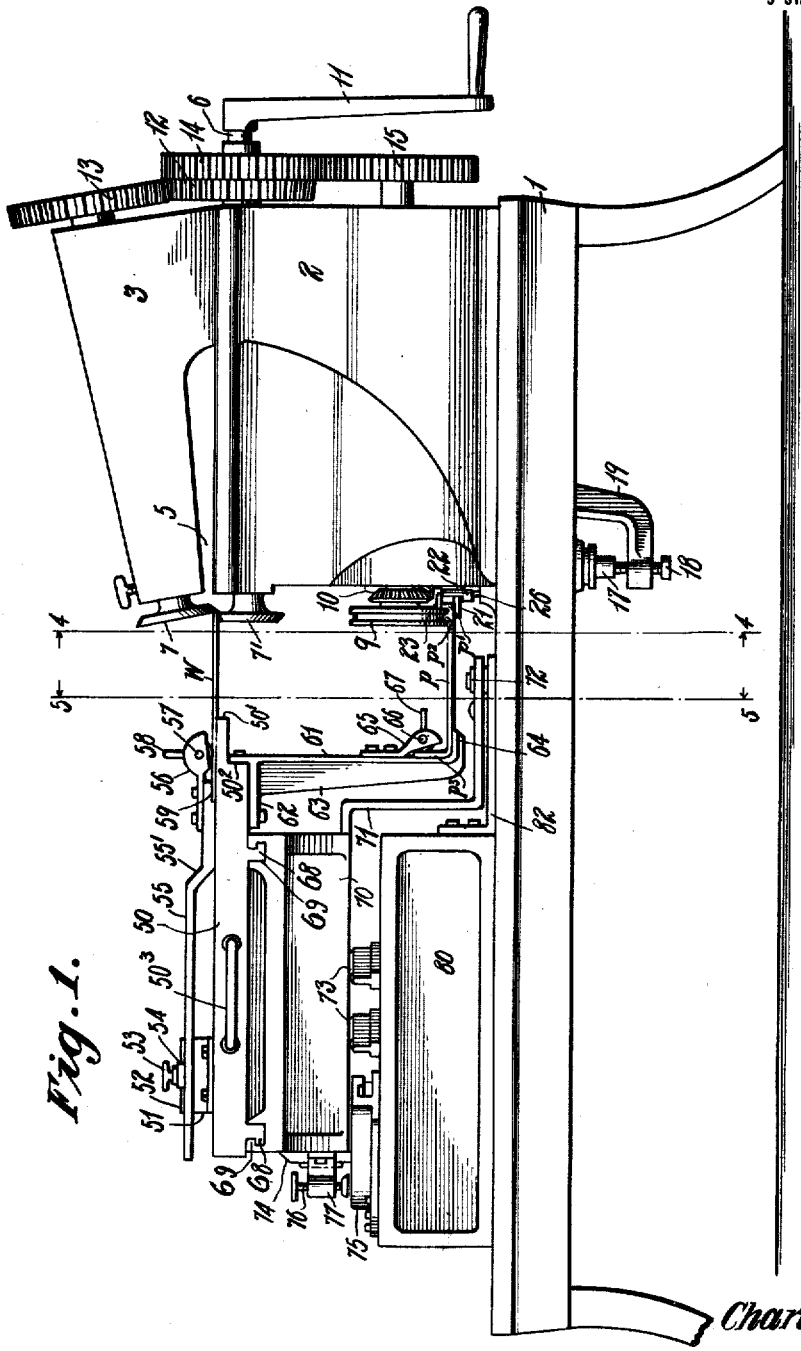
Figure 1 is a side elevation of the complete machine.
Figure 6:
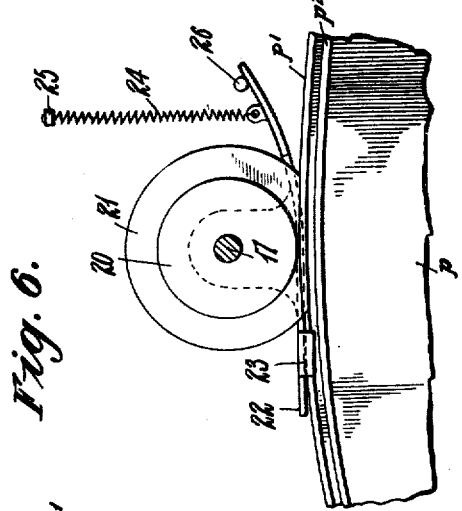
Fig. 6 is a detail in plan of a pattern guiding and feeding element.
Figure 7:
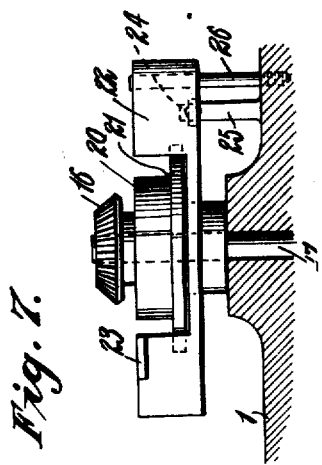
Fig. 7 is a side elevation of the pattern guiding and feeding element illustrated in Fig. 6.
Figure 5:
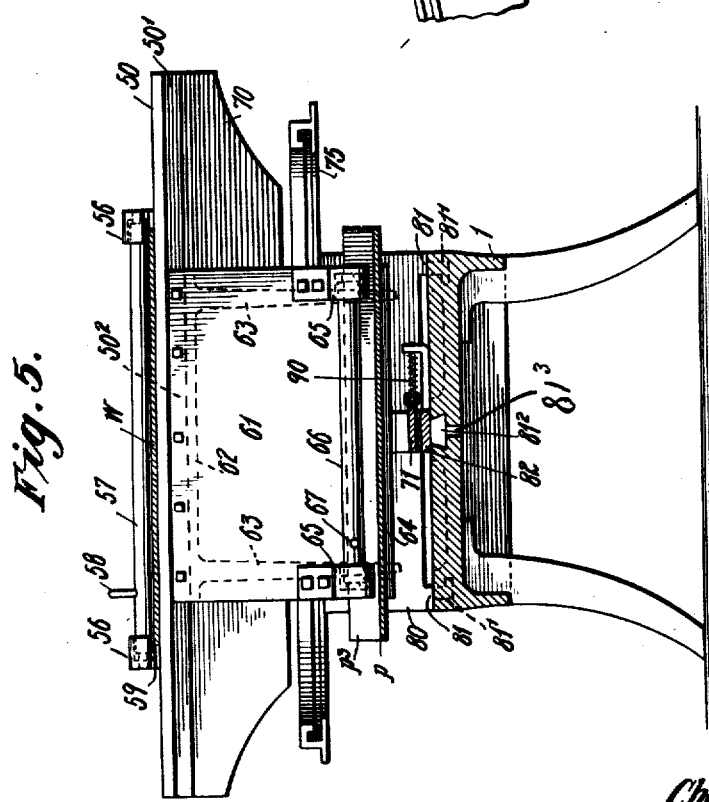
Fig. 5 is a section on the line 5—5 of Fig. 1 looking toward the work holding table.

The particular embodiment of the invention shown in the drawing comprises an elongated main support or machine bed 1, elevated above the floor by legs or other pedestals in the customary manner, upon one portion of which (the right as viewed in Fig. 1) is supported a housing for the cutting or other tool and pattern controlling means with their driving gears and shafting; and, upon another portion, (the left in Fig. 1) is supported a universally movable work support or table to which the work sheet to be cut or tooled is clamped and to which, also, the pattern, which imparts and guides the relative movement of work sheet and tool is secured.

The housing for the pattern controlling devices and tool with their operative mechanism is shown at 2 and 3. The housing 3 is mounted on the housing 2 and carries the shaft 4 to one end of which is secured the upper member 7 of a pair of rotary devices shown as shears 7, 7'. The housing 3 is spaced from the housing 2 a considerable distance from and in line with the bite of the rotary shears 7, 7', in order to permit a work piece to enter and move between the said housings as shown at 5 in Fig. 1. The shaft 6 carries the lower blade or shear member 7' and is mounted in the upper portion of the housing 2. The shafts 4 and 6 are relatively inclined with respect to each other and carry the shears 7 and 7' on their adjacent ends. The housing 3 is fitted in a guide way on top of the housing 2, whereby it may be adjusted if desired. In the lower portion of the housing 2 is mounted a shaft 8 carrying at one end a grooved roll 9, approximately in the plane of the shears, and a beveled pinion 10. Keyed to the shaft 6 is a hand crank 11 by which the mechanism is operated; but power mechanism may of course be used if desired. Rigid on the shaft 6 is a beveled gear 12 meshing with a gear 13 on shaft 4 to drive the upper shear blade 7; also a spur gear 14 that meshes with a spur gear 15 secured to the shaft 8. A beveled pinion 16 meshes with said beveled pinion 10 on the end of shaft 8. The beveled pinion 16 is mounted on a shaft 17 sustained at its lower end by an adjustable thrust bearing 18 threaded through a bracket 19 depending from the under side of the bed 1. On the shaft 17 below the pinion 16 is mounted a flanged roll having an upright cylindrical surface 20 and a flange 21. The surface 20 is spaced from the inner face of the said grooved roll 9 in order to admit the guide flange p' of a pattern. Pivoted on the shaft 17 beneath the flanged roll 20—21 is a friction guide 22 adapted to bear against the face of the flange p' of the pattern, and also having an overlying guard 23 adapted to engage the upper edge of said pattern flange. This guide member 22 is formed with a wide notch between its ends, open from above, through which the perimeter of said roll 20—21 may project; a spring 24 urges the end of the guide member that carries the guard 23 outward into contact with the pattern flange $p'$. Said spring 24 is attached by one end to the friction guide 22 and by its other end to a lug 25 secured to the bed 1. A stop pin 26 limits the movement of said guide member 22 in one direction.

The immediate work support or table for holding the sheet to be cut by shears 7 and 7' is adapted to be moved back and forth with respect to the shears transversely either at right angles or oblique to said back and forth movement, and to swing in an arc. This adaptability for universal movement is effected by means of a compound work support composed of three superposed moving parts 50, 70 and 80, the upper two resting on the lower which is guided on the machine bed 1.

The immediate work-sheet support comprises a flat table 50 which may be a rectangular plate having an edge 50' extending in general transversely of the bed 1 and suitably spaced from the shears 7, 7'. Upon the upper surface of the table 50, well back from its front edge, is secured a clamping pedestal 51 having a central guide member 52 and a clamping screw 53 passing loosely through a clamping washer or plate 54. A plate 55, illustrated as triangular, is utilized for clamping the work sheet W to the table 50. This plate 55 has at its front end projecting ears 56 which serve as bearings for an eccentric clamping bar 57 having a handle 58. The front edge of the plate 55 is rabbeted as shown at 59 to receive beneath it the edge of a work sheet W. The forward portion of the plate 55 is adapted to lie in close contact with the table 50. Rearward of the part in contact with the table 50 the plate is somewhat offset as shown at 55' and is provided with a longitudinal slot 60. In the said slot 60 the said guide 52 fits and the clamp screw 53 passes through it into the pedestal 51 whereby the clamp plate 55 may be adjusted to and from the shears. It is obvious that clamping screws or other clamping means may be used in place of the eccentric bar 57.

Depending from the inner side of the table 50 near its front edge or that edge that is adjacent the shears is a member 61 comprising a rectangular plate, preferably a casting, having a smooth rectangular front surface, a flange 62 projecting rearward near its upper edge, and strengthening ribs 63 extending vertically. At the lower portion of the casting 61 is a right angular ledge or shelf 64. The table 50 is rabbeted beneath its said front edge, as shown at $50^2$. The casting 61 is bolted to the table 50, as shown through the flange 62 and upper edge of the casting above said flange so that the front surface thereof depends perpendicularly with respect to the top surface of said table 50. A pair of bearing ears 65 on the front surface of the casting 61 sustains an eccentric clamping bar 66 having an operating handle 67. The pattern $p$ is adapted to rest on the ledge 64 and be clamped to the surface 61 by means of the eccentric bar 66 bearing against a flange $p^3$ on the pattern. It is obvious, however, that other clamping means might be used.

On the under side of the table 50 is a pair of parallel guide members 68 of ordinary form each member being adapted to be guided in a guideway 69 of the intermediate supporting member 70. The said guides 68 and guide ways 69 provide for the movement of the table 50 in right lines transversely, or parallel with the face of the cutting shears 7, 7' or obliquely thereto. The table 50 may be moved by hand, if desired, with the aid of the handle $50^3$ secured to one end.

The said intermediate supporting member 70, which supports the table 50 is adapted to swing around the bolt 72. The double angled member 71 bolted to the member 70 is pivoted on said bolt 72 which is secured to block 72'. The under surface of the member 70 rests upon bearing rollers 73 which are arranged in series radiating from the bolt 72. Bolted to the member 70 on the side opposite the doubled angled member 71 is a guide member 74 which fits and travels within a guide 75 of arcuate form having its arc described about said bolts 72. Thus the said member 70 may oscillate in a circular path about the bolt 72 and carry the table 50 with it in its oscillations, and the table 50 may also slide back and forth at right angles to the vertical plane of the arm 71. The clamp screw 76 set in bracket 77 carried on the member 70 is adapted to bear upon the guideway 75 whereby the member 70 may be prevented from moving in a circular path when so desired and may be fixed at a desired angle on the lower member 80.

The roller bearings 73 and the guide way 74 are secured to the top of the lower supporting member 80 of the compound work support. The member 80 is adapted for movement backward and forward toward and from the plane of the shears. On the lower side of the member 80 near its outer edges are a pair of guides 81 which travel in guide ways 81' formed in the table 1. Between the ends of the table 1, in its upper surface, is an undercut groove $81^2$ in which the block 72' before referred to is adapted to slide backward and forward transversely of the plane of the shears 7, 7'. An arm 82 is bolted to the support 80 and projects therefrom toward the plane of the shears and is connected to the bolt 72 previously mentioned, said bolt 72 entering the block 72'. A slot 81³ is cut through the table 1 from the bottom of the groove 81². Depending from the block 72' is a threaded shank 83 upon which is mounted a nut 84. Thus, if desired, the block 72' may be fixed in different positions along the slot 81² whereby the table 80 may be prevented from movement in a right line to and from the plane of the shears, and when the table 80 is prevented from having such movement the two members 70 and 50 superimposed upon it are prevented from backward and forward movement also.

The pattern $p$ has a flange $p'$ adapted to be engaged between the inner face of the grooved roll 9 and the wide cylindrical face of the roll 20 carried on the shaft 17. The under face of the pattern $p$ beneath the flange $p'$ is adapted to rest upon the flange 21 of said roll on shaft 17. The rib $p^2$ which runs parallel with the flange $p'$ is adapted to be engaged by the groove on the perimeter of the roll 9 as shown in Fig. 3. The straight flange $p^3$ extending at right angles to the body of the pattern is adapted to seat against the face of casting 61 and the corner of the pattern rest in the right-angular corner between the face of the casting 61 and the ledge 64. The eccentric 66 or other suitable clamping means may engage the flange $p^3$ and hold the pattern rigidly and firmly in place upon the casting 61. The work sheet W may be clamped to the top of the table 50 beneath the clamping device as illustrated in Fig. 3.

Having selected the required pattern and secured it in place upon the casting or pattern holder 61 the work support 50 may be moved laterally into such position that the pattern may be adjusted with the end of the flange $p'$ and the end of the rib $p^2$ in position to engage the guiding and feeding rolls 9 and 20. The work sheet W will of course be clamped in place upon the table 50 in position above the pattern $p$. Assuming now that the work sheet and pattern are clamped in place as shown and the block 72' is released so that it is free to travel back and forth in the groove 81, the clamp screw 76 being also released, the table 50 is now adapted to move universally in any direction in one plane controlled by the pattern, or by hand, as may be conveniently done by aid of the handle 50³ shown on one end of the table 50. Rotation of crank 11 rotates the shears 7, 7' and also the pattern guiding rolls 9, 20, 21, in a direction to feed the pattern between them. As the pattern advances it will move the table 50 since it is clamped firmly to it, and the table 50 will execute the movements imposed upon it by the shape of the flange $p'$ of the pattern which will always tend to keep the face of roll 9 parallel with it or tangent to it. Thus the work piece W as it is presented to the shears 7, 7' by feeding movements imparted by the pattern $p$ identical with the movements of the pattern will be transformed into an exact duplicate of the said pattern in contour. Although motion is intended to be imparted to the table 50 by contact of the feeding devices with the pattern, the movement of the table may be aided by hand if desired. The work piece may be guided entirely by hand by removing the pattern from the holder. By clamping the block 72' and the clamp screw 76 the table 50 may have right line movement only and shear the work piece W on a straight line. It will be obvious also that the clamp screw 76 may alone be secured if desired leaving the table 50 free to move in directions at right angles to each other.

In order to counteract the effect of inertia on the swinging table 70 under the impulse of the rolls 9 and 20, when a change of direction is required by the pattern, a counterbalancing spring 90 is attached by one end to the member 71 which is pivoted to the bolt 72, and by its other end to a bracket extending from the arm 82 that projects from the member 80.

This machine is particularly useful for cutting stove pipe elbows and the like from sheet metal but it is apparent that in principle it is not limited to cutting any particular material for any particular purpose or to cutting at all. I have shown as the operating tool an ordinary pair of rotary shears but other tools may be used. The principle involved does not require any specific form of tool, since other types of cutting devices, or bending or marking tools may be used without departing from the principle of my invention.

Having described my invention in the best embodiment now known to me and described its use, what I claim and desire to secure by Letters Patent is, 1. The combination of a work-holding member and a tool member, one of said members adapted to have universal movement in one plane, means for securing a pattern to one of said members, and a combined pattern guide and feeding means fixed with respect to the other member for guiding the relative movement of pattern and tool and effecting the relative feed of work and tool.

2. The combination of a support, a tool and a work-holder mounted on said support, said work-holder having a universal movement in one plane and adapted to present the work to the tool, means for holding a pattern on the work-holder, feeding mechanism arranged to engage the pattern and guiding means for the pattern, said feeding mechanism and guiding means being adapted to feed and guide the work-holder by engagement with said pattern.

3. The combination of a tool, a work-holder and a support therefor, said work-holder having a universal movement in one plane and adapted to present work to the tool, means for holding a pattern having a flanged guiding edge on the work-holder, a roll adapted to engage one face of the pattern adjacent its flanged edge and a flanged roll at right angles to said first named roll adapted to support the other face of the pattern and to engage the pattern flange between it and said first named roll and means for driving said pattern engaging rolls.

4. The combination of a tool comprising coöperating rotary members, a work-holder mounted for universal movement in one plane and adapted to present work to the tool, means for holding a pattern having a flanged edge on the work-holder, a roll adapted to engage the pattern on one face adjacent its flanged edge, a roll arranged at right angles thereto and having a flange for supporting the other face of the pattern and adapted to receive the flange thereof between said flanged roll and one face of said first mentioned roll, driving connections between said two rolls, and driving mechanism adapted to rotate the members of the tool and the guiding and feeding rolls in proper timed relation.

5. In a pattern controlled mechanism, the combination of a pattern-holding member having universal movement in one plane, means for operating and guiding said member comprising a feed roll engaging one surface of a flanged pattern, a second feed roll arranged at right angles thereto and having a flange for supporting said pattern, said means for operating and guiding adapted to receive the flange of said pattern between the face of the first mentioned roll and the perimeter of the second mentioned roll, and means for rotating said guiding and feeding rolls.

6. The combination of a member having universal movement in one plane adapted to hold a pattern having a flanged guiding edge, means for guiding and operating said movable member comprising a roll adapted to engage the face of the pattern adjacent the guiding edge, a second roll at right angles thereto having a flange adapted to support the pattern and to engage the flange of the pattern between the face of one roll and the perimeter of the other, means for rotating said rolls and a guiding member yieldingly pressed against the edge of the flange on the pattern and having a guard overlying the edge of said pattern flange.

7. The combination of a pattern controlled member having means to secure a pattern thereto, said pattern having a flanged outer guiding edge and a guide rib parallel therewith, a grooved roll adapted to engage the guide rib of the pattern, a roll at right angles thereto adapted to engage the outer face of the flange, means for holding the pattern in engagement with the grooved roll in order to press the rib into engagement with said groove and means for rotating said rolls.

8. The combination of a pattern having on its outer edge and a rib parallel a flange thereto, a feed roll having a groove engaging said rib and its face engaging the inner face of said flange, a feed roll at right angles to said grooved roll and engaging the flange between its periphery and the face of said grooved roll, a spring pressed member bearing upon the outer face of the flange and cut away to admit the periphery of said upright roll and a guard on said spring pressed bearing member arranged to overlie the edge of the pattern.

9. In a machine of the class described, an upper support, an intermediate support on which said upper support is transversely movable in right lines, an under support upon which said intermediate support is mounted to oscillate a machine bed, and means on the machine bed for guiding said under support in right lines.

10. In a machine of the class described a support, an intermediate support upon which said first mentioned support is adapted to move transversely in right lines, an under support adapted to slide in right lines transverse of the movement of said first named support, means for pivotally connecting said under support and said intermediate support.

11. In a machine of the class described an upper work support, an intermediate support upon which said work support is movable transversely, an under support movable in right lines transverse to the movement of said upper support, a pivotal connection between said intermediate support and said under support and adjustable means for preventing the movement of the under support.

12. In a machine of the class described an upper support, an intermediate support upon which said upper support is movable transversely and an under support to which the intermediate support is pivoted, said under support being adapted to move in right lines transversely of the movement of the upper support, and an adjustable device whereby the intermediate support may be secured to the under support.

13. The combination of a work table having a work engaging and clamping means comprising a member having an overlying edge adapted to fit over the work sheet and properly aline it, clamping means adapted to clamp the sheet to the table and means for securing said work engaging and clamping means in different positions on the table.

14. In a pattern controlled mechanism, a tool, a support therefor, pattern guiding means arranged on the support in the plane of operation of the tool, a work table universally movable in one plane and having means adapted to hold a pattern and present it to the pattern guiding means.

15. In a machine of the class described the combination of a tool, a support therefor, a pattern guide arranged on the support substantially in the plane of operation of the tool, a work table having a universal movement in one plane, a member depending from the edge of the table that is adjacent to the tool, a shelf projecting at right angles from said depending member, a clamp located above the shelf adapted to secure a flanged pattern to said depending member in position to engage said pattern guide on the tool support.

16. In a pattern controlled mechanism a tool member comprising a pair of rotary shears, a work-holding member coöperating therewith, means for mounting said tool and work holding member whereby one may move universally in one plane with respect to the other, means for securing a pattern fixedly with respect to one of said members, and a pattern guide in fixed relation to the tool member and in the plane of operation thereof.

17. The combination of a machine bed, a tool comprising a rotary disk adapted to operate upon a sheet, a work support comprising an under member, guiding means therefor comprising a guide on the bed at right angles to the plane of the disk, a member projecting from said under member toward said plane and guided on the bed, an intermediate member mounted on said under member to oscillate thereon, a member projecting from said intermediate member and pivotally connected to said member projecting from the under member, an upper member mounted on said intermediate member, and slidable transversely thereof, a pattern holder depending from the upper member and a pattern guiding means connected to the bed beneath the disk.

In testimony whereof I affix my signature.

CHARLES JOHANSON.